(12) United States Patent
Hemzacek et al.

(10) Patent No.: US 6,279,845 B1
(45) Date of Patent: *Aug. 28, 2001

(54) MAGNETIC TAPE REEL COUPLING

(75) Inventors: Wayne R. Hemzacek; David T. Hoge, both of Westminster; Joseph P. Falace, Louisville; David C. Graves, Fort Collins; Clark Janssen, Loveland, all of CO (US); Michael W. Johnson, Cottage Grove; Steven A. Bendson, Edina, both of MN (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/660,109

(22) Filed: Sep. 12, 2000

Related U.S. Application Data

(63) Continuation-in-part of application No. 09/546,774, filed on Apr. 11, 2000.

(51) Int. Cl.[7] .................................................... G11B 23/04
(52) U.S. Cl. ............................ 242/340; 242/356; 360/85; 360/93
(58) Field of Search .................................... 242/340, 342, 242/348, 611, 611.1, 356; 360/132, 85, 93

(56) References Cited

U.S. PATENT DOCUMENTS

| 3,857,531 | 12/1974 | Jantzen . |
| 4,654,740 | 3/1987 | Katoku . |
| 4,775,115 | 10/1988 | Gelardi . |
| 5,366,173 | 11/1994 | Lammers et al. . |
| 5,564,647 | 10/1996 | Bay et al. . |
| 5,992,782 | * 11/1999 | Goodknight ........................ 242/340 |

FOREIGN PATENT DOCUMENTS

| 0 284 687 | 10/1988 | (EP) . |
| 2236092 | 3/1991 | (GB) . |

* cited by examiner

Primary Examiner—John Q. Nguyen
(74) Attorney, Agent, or Firm—Brooks & Kushman P.C.

(57) ABSTRACT

A coupling for driving a magnetic tape reel uses the interface between a flat surface on the coupling and datum pads on the reel to locate the reel. The coupling includes a drive ring with ring teeth located around a drive shaft. The ring teeth engage mating teeth on the tape reel. The coupling also includes a datum ring having an annular surface located about the drive shaft. The annular surface contacts datum pads on the tape reel to axially position the tape reel relative to the drive shaft.

12 Claims, 4 Drawing Sheets

MAGNETIC TAPE REEL COUPLING

CROSS-REFERENCE TO RELATED APPLICATIONS

This application is a continuation-in-part of a U.S. patent application Ser. No. 09/546,774 titled "Tape Drive System With Engagement Control Feature" to Johnson et al. filed Apr. 11, 2000, which is expressly incorporated herein by reference in its entirety.

TECHNICAL FIELD

The present invention relates to driving reels upon which magnetic tape is wound.

BACKGROUND ART

Magnetic tape is commonly used to store voice and data information due to its reliability, cost efficiency, and ease of use. Magnetic tape may be made more useful and cost-effective by increasing the density of information stored and decreasing the time required to access this information. Tape may be made wider and data tracks written on the tape narrower to increase the areal density of information stored on the magnetic tape. Tape may be made thinner to increase the volume of information stored on a reel of tape. Tape may be moved past the tape head faster to increase the rate of information transfer. Tape paths may be shortened to decrease access time, decrease costs, and decrease the size and complexity of tape access systems. These factors generally necessitate increased accuracy in positioning magnetic tape relative to tape access components.

Tape is typically wound on one or two reels in a protective housing, such as a cassette or cartridge. The path of magnetic tape leaving its containment housing depends on the positioning of the reel relative to the tape player. Typically, this position is established at the interface of the tape reel and the tape player drive coupling used to spin the tape reel. Current coupling designs locate the reel by mating drive teeth on the coupling with drive teeth on the reel. Fixturing the reel to the coupling using this relatively complex geometry is prone to many types of misalignment errors. These errors, representing the accuracy of tape reel location, can be expressed using a variety of geometric criteria. First, axial difference between the tape centerline of the reel and the tape path centerline of the drive represents a positioning offset in the plane of tape travel. Second, perpendicularity of the tape reel axis relative to the tape path centerline of the drive indicates the angular error of the tape path leaving the reel. Third, run out of the tape reel, typically measured at the outside edge of the reel flange, produces a time-varying error in the tape path. Runout is expressed as two components, the axial variation of the reel flange and the radial variation of the reel flange.

If mating drive teeth on the coupling and reel flange are used to position the tape reel, the drive tooth pattern must be very precisely manufactured. Additionally, if the drive teeth become deformed due to mishandling, wear, debris, or the like, the alignment of the reel could be impacted. Typically, the drive teeth on the reel are made of plastic. These teeth wear, break, and deform differently on different cartridges. Hence, misalignment errors may vary greatly between cartridges.

What is needed is to couple tape drives to tape reels in a manner that does not rely on the geometry of drive teeth. In particular, correct axial positioning is needed to minimize tape path errors. Such a coupling should be implemented within cost and space constraints imposed by commercial tape players and cartridges.

DISCLOSURE OF INVENTION

It is an object of the present invention to couple tape reels to tape drives without relying on drive teeth as the principal means for establishing position.

Another object of the present invention is to more accurately position tape reels.

Still another object of the present invention is to position tape reels onto drive couplings in a mainer that is less susceptible to manufacturing tolerances.

Yet another object of the present invention is to couple tape reels to tape drives in a manner that is less susceptible to mechanical damage.

In carrying out the above objects and other objects and features of the present invention, a coupling for driving a magnetic tape reel is provided. The coupling includes drive teeth located a fixed radial distance from a drive shaft. The drive teeth drive a tape reel by engaging mating teeth on the tape reel. An annular surface is also located about the shaft. The annular surface contacts datum pads on the tape reel to axially position the tape reel relative to the drive shaft.

In an embodiment of the present invention, three datum pads on the tape reel define a tape reel axial location plane.

In another embodiment of the present invention, the drive teeth are located on a drive ring. The coupling also includes a flexure assembly permitting the drive ring to float in the axial direction.

In still another embodiment of the present invention, the coupling includes a magnet attracting a magnetically sensitive surface of the tape reel to engage the drive teeth with mating teeth on the tape reel.

In a further embodiment of the present invention, the annular surface is located on a datum ring and the drive teeth are located on a drive ring.

A system for accessing magnetic tape is also provided. The system includes tape cartridges having at least one reel upon which magnetic tape is wound and unwound. The reel has a reel surface accessible through an opening in the tape cartridge. The reel surface defines reel teeth and a plurality of datum pads. The system also includes a tape unit. The tape unit has at least one recording head for accessing information on the magnetic tape. The tape unit also has a drive ring with drive teeth located a fixed distance about a drive shaft. The drive teeth engage the reel teeth to drive the tape reel when the drive ring is spun by a motor. The tape unit also includes a datum ring defining an annular surface radially located about the drive shaft. The annular surface contacts the datum pads to axially position the tape reel relative to the drive shaft.

A method for coupling a drive shaft to a magnetic tape reel is also provided. The tape reel is located relative to a drive axis by contacting an annular surface rotating about the drive axis with datum pads on the tape reel flange. Drive teeth rotating about the drive axis engage with mating reel teeth to spin the tape reel flange.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
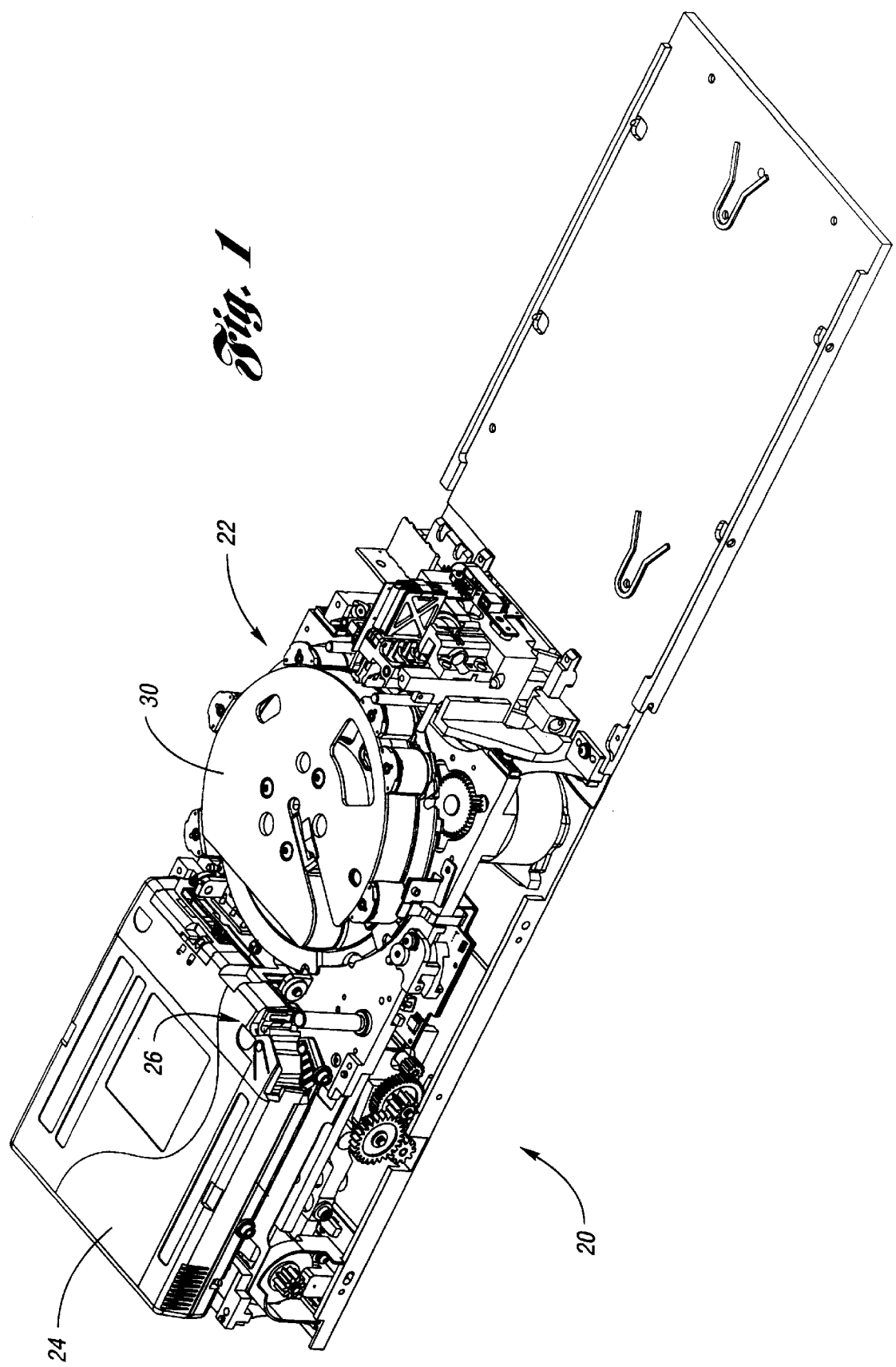
FIG. 1 is a drawing of a tape access system that may incorporate aspects of the present invention.

Referring to FIG. 1, a drawing of a tape access system that may incorporate aspects of the present invention is shown. A magnetic tape access system, shown generally by 20, includes tape unit 22 receiving one of a plurality of tape cartridges 24. Each tape cartridge 24 contains a tape reel about which magnetic tape is wound. Tape cartridge 24 includes tape slot 26 through which passes the magnetic tape. The tape moves past a tape head, not shown, which reads data from an writes data to the magnetic tape, and onto take-up reel 30. Tape cartridge 24 also has an opening on the bottom surface, not shown, permitting the bottom flange of the tape reel to contact a drive coupling in tape unit 22. A motor in tape unit 22 spins the coupling through a shaft to drive the magnetic tape past tape head 28.

Figure 2:
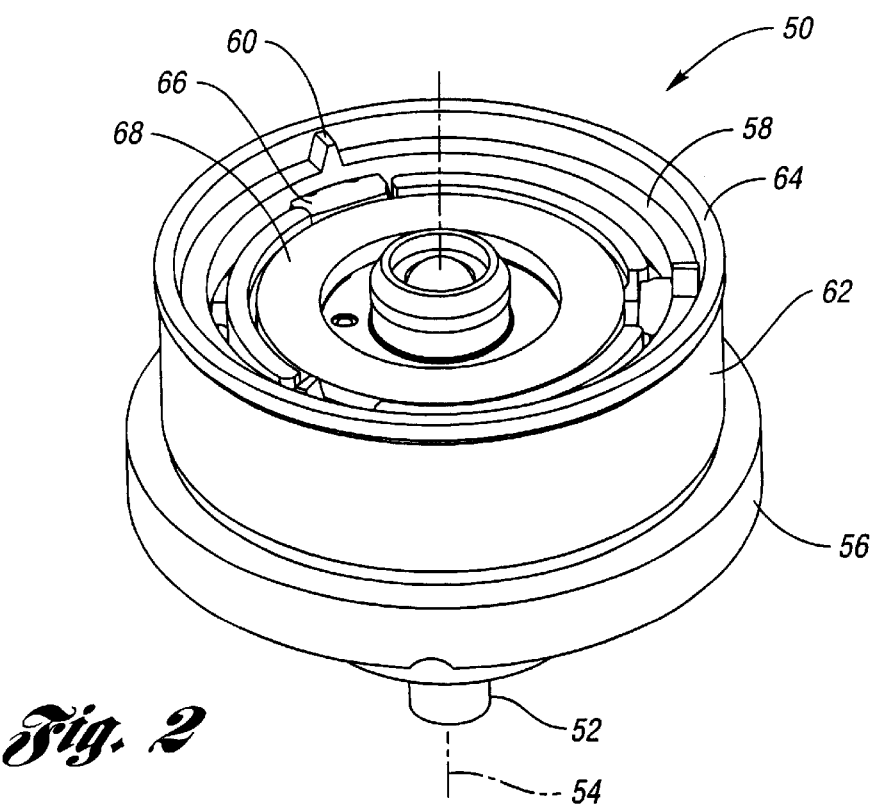
FIG. 2 is a drawing of a drive coupling according to an embodiment of the present invention.

Referring now to FIG. 2, a drawing of a drive coupling according to an embodiment of the present invention is shown. A drive coupling, shown generally by 50, has drive shaft 52 driven to rotate about drive axis 54 by a motor, which includes motor rotor magnet 56. Drive ring 58, encircling shaft 52, includes a plurality of drive teeth, one of which is indicated by 60. Drive teeth 60 engage mating teeth on the tape reel. Datum rings 62, also encircling shaft 52, defines annular surface 64. Annular surface 64 contacts datum pads on the tape reel to axially position the tape reel relative to the drive shaft.

In an embodiment of the present invention, flexure assembly 66 acts as a spring against the back side of drive ring 58, permitting drive ring 58 to float in the axial direction parallel to drive axis 54. Drive coupling 50 may also include magnet 68 for attracting a magnetically-sensitive surface of the tape reel. This engages drive teeth 60 with mating teeth on the tape reel.

Figure 3:
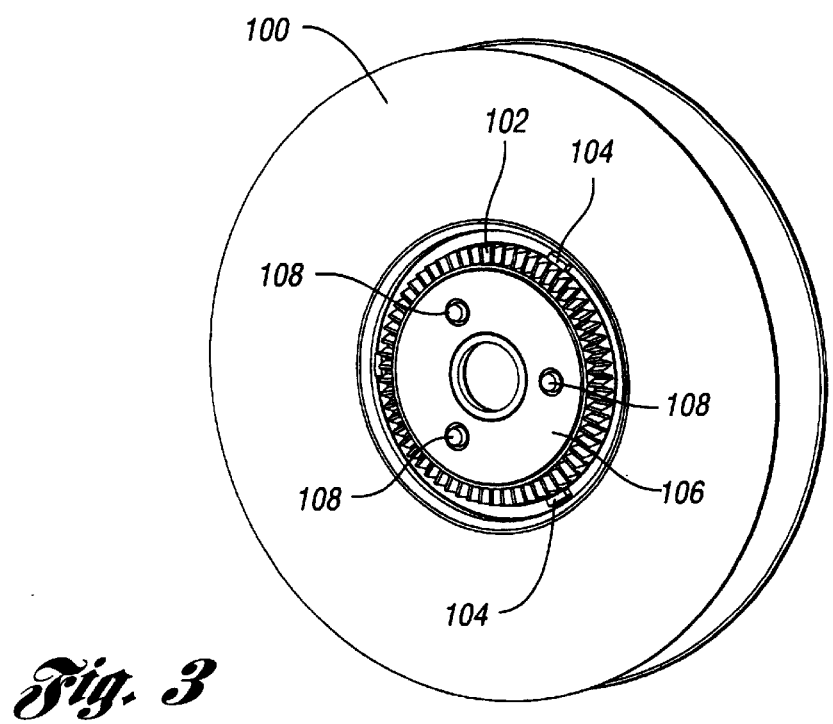
FIG. 3 is a drawing of the bottom flange of a tape reel according to an embodiment of the present invention.

Referring now to FIG. 3, a drawing of the bottom flange of a tape reel according to an embodiment of the present invention is shown. Tape reel bottom flange 100 defines a plurality of reel teeth 102. Reel teeth 102 mate with drive teeth 60 in drive coupling 50. Bottom flange 100 also defines a plurality of datum pads 104. Datum pads 104 contact annular surface 64 on datum ring 62. In a preferred embodiment of the present invention, bottom flange 100 includes three datum pads 104 defining a tape reel axial location plane.

Bottom flange 100 may also include washer 106 made from a magnetically attracted material. Washer 106 may be press-fit onto nibs 108, staked, glued, molded, or otherwise made part of bottom flange 100. When bottom flange 100 comes within close proximity to drive coupling 50, magnet 68 attracts washer 106 engaging reel teeth 102 with drive teeth 60.

Figure 4:
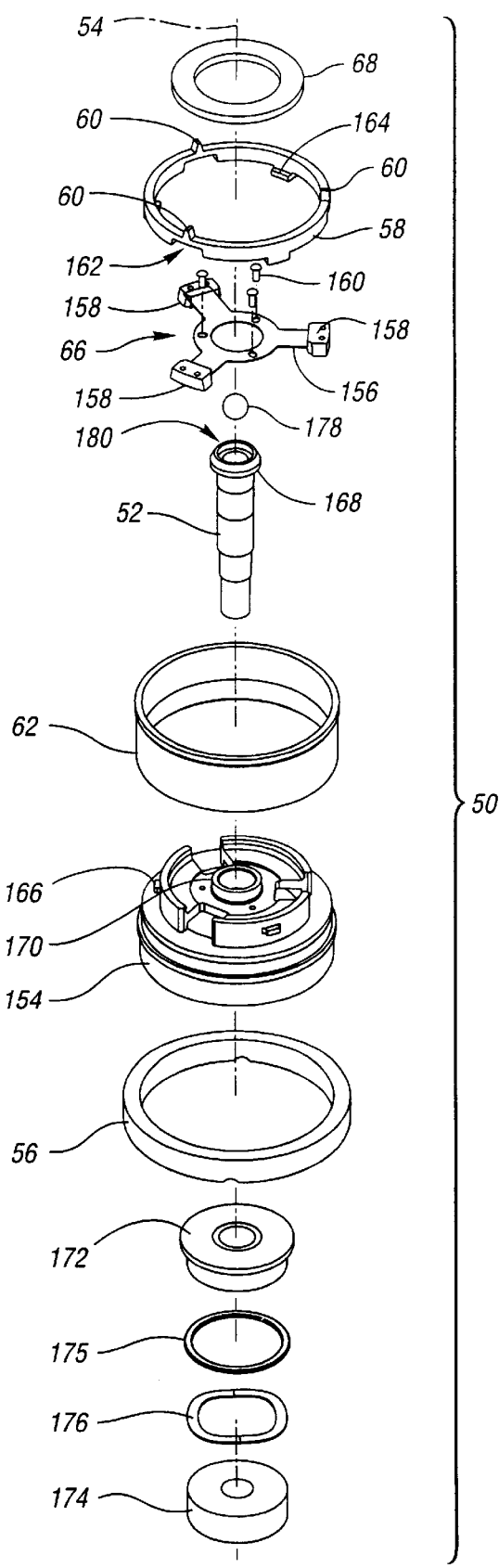
FIG. 4 is an exploded view a drive coupling according to an embodiment of the present invention.

Referring now to FIG. 4, an exploded view of a drive coupling according to an embodiment of the present invention is shown. Datum ring 62 rests on coupling body 154. Flexure assembly 66 includes spring element 156 onto which are attached pads 158. Flexure assembly 66 is attached to coupling body 154 with screws 160. Slots 162 in drive ring 58 fit over pads 158. Ridges 164 on drive ring 58 fit over tabs 166 on coupling body 154 to hold drive ring 58 to coupling body 154. Magnet 68 is held onto coupling body 154 by magnetic attraction or an adhesive.

Drive shaft 52 passes through coupling body 154 until flared top 168 contacts flange 170 on coupling body 154. Top bearing 172 and bottom bearing 174 are press-fit onto shaft 52 with washer 175 and wave washer preload spring 176 held on the top surface of bottom bearing 174. Cartridge lock release button 178 is press-fit into cavity 180 in flared top 168 of shaft 52.

Standard engineering materials may be used to manufacture the components of drive coupling 50. For example, drive ring 58 and datum ring 62 may be die cast zinc alloy steel. Coupling body 154 may be 1020 steel. Drive shaft 52 may be 303 stainless steel. Cartridge lock release button 178 may be any low friction plastic. Flexure assembly 66 includes plastic pads 158 insert molded onto spring steel spring element 156.

Figure 5:
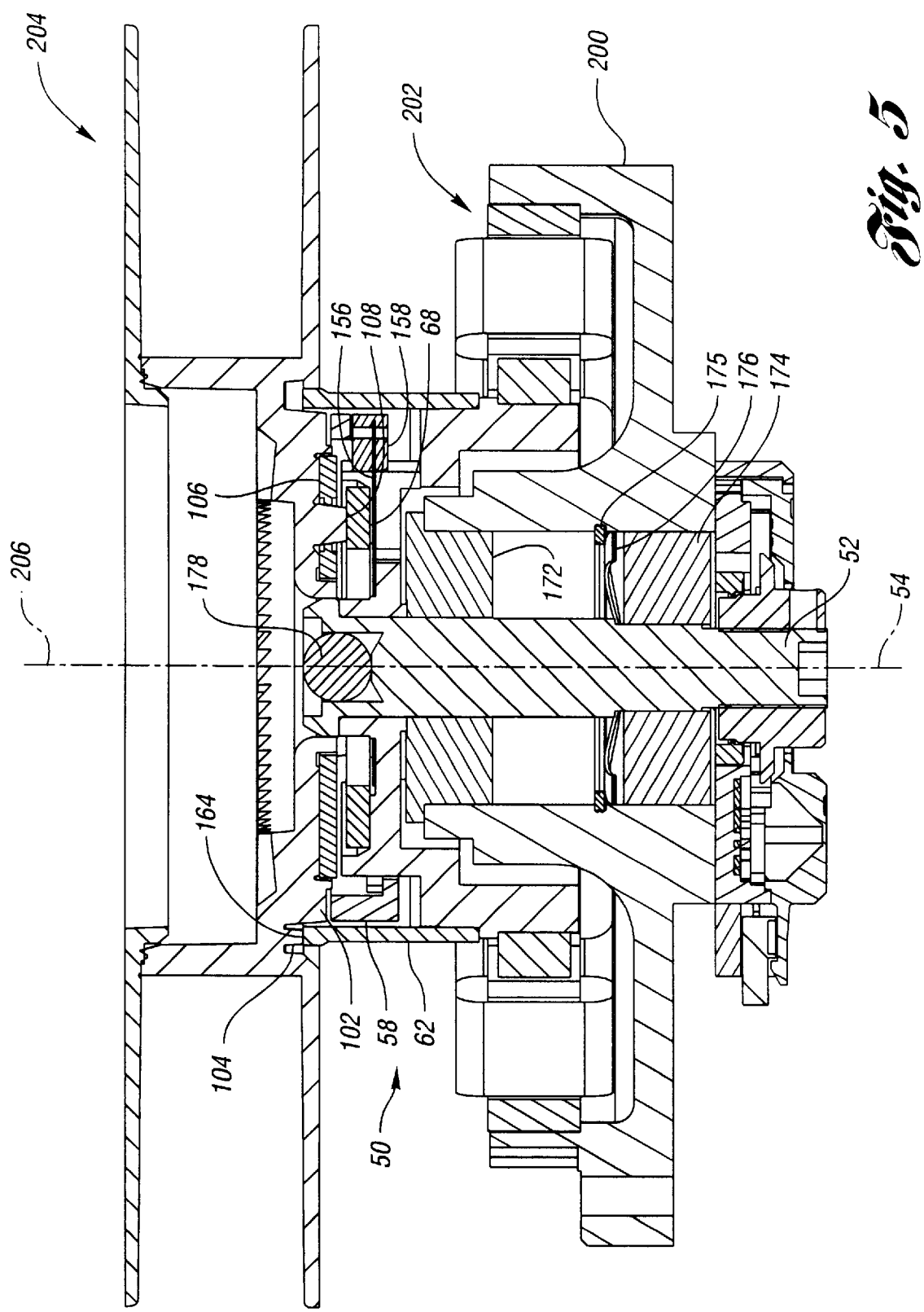
FIG. 5 is a cross-sectional view of a tape reel and drive coupling according to an embodiment of the present invention.

Referring now to FIG. 5, a cross-sectional view of a tape reel and drive coupling according to an embodiment of the present invention is shown. Outer races of top bearing 172 and bottom bearing 174 are attached to motor bracket 200, rotatively isolating drive shaft 52 from motor bracket 200 attached to tape unit 22. Stator assembly 202, fixed to motor bracket 200, drives motor rotor magnet 56, rotating drive coupling 50.

A tape reel, shown generally by 204, is axially located along drive axis 54 by datum pads 104 on reel bottom flange 100 contacting annular surface 60 on datum ring 62. Manufacture of annular surface 64 on datum ring 62 may be accomplished using a facing operation, resulting in greater accuracy and reliability as well as decreased cost over the previously required machining of complex teeth geometries. Datum pads 104 may be molded integrally with bottom surface 100. This results in points of location at least as accurate as the previously required complex tooth geometry also molded into bottom surface 100.

Since datum pads 104 and annular surface 64 axially locate reel 204 relative to coupling 50, drive teeth 60 fixed relative to coupling 50 may not fully engage with reel teeth 102. Rotational backlash may then develop by driving reels 204, possibly increasing wear on reel teeth 102 and datum pads 104. To promote engagement between drive teeth 60 and reel teeth 102, drive ring 58 floats axially with respect to the remainder of drive coupling 50. Drive ring 58 is supported by flexure assembly 66, which is axially compliant yet rotationally rigid. When reel 204 is mounted onto coupling 50, flexure assembly 66 is loaded, providing a slight axially force on drive ring 60 for proper engagement of teeth 60, 102.

The interface between drive teeth 60 and reel teeth 102 is rotationally self-locking. The pressure angle resulting from the geometry of drive teeth 60 is such that torsional forces will not cause teeth 60 to cam out or disengage. The interface between flexure assembly 66 and drive ring 58 is similarly self-locking. Pads 158 in flexure assembly 66 engage slots 162 in drive ring 58.

Many variations on the embodiments described are possible within the spirit and scope of the present invention. For example, a drive coupling may rotate about a drive shaft. Drive teeth and an annular surface may be located upon the same component of a drive coupling. The term annular refers to the region of contact by datum pads and, hence, any flat surface on a drive coupling may suffice. Any number or profile of drive teeth and reel teeth may be used.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A coupling for driving a magnetic tape reel comprising:

a drive shaft;

a plurality of drive teeth located a fixed radial distance from the drive shaft, the plurality of drive teeth driving the tape reel by engaging mating teeth on the tape reel; and an annular surface radially located about the drive shaft, the annular surface contacting a plurality of datum pads on the tape reel thereby axially positioning the tape reel relative to the drive shaft.

2. A coupling for driving a magnetic tape reel as in claim 1 wherein the plurality of datum pads is three datum pads, the three datum pads defining a tape reel axial location plane.

3. A coupling for driving a magnetic tape reel as in claim 1 wherein the drive teeth are located on a drive ring, the coupling further comprising a flexure assembly permitting the drive ring to float in the axial direction.

4. A coupling for driving a magnetic tape reel as in claim 1 further comprising a magnet for attracting a magnetically sensitive surface of the tape reel thereby engaging the plurality of drive teeth with the mating teeth on the tape reel.

5. A coupling for driving a magnetic tape reel as in claim 1 wherein the annular surface is located on a datum ring and the drive teeth are located on a drive ring.

6. A system for accessing magnetic tape comprising:

a plurality of tape cartridges, each tape cartridge having at least one reel upon which magnetic tape is wound and unwound, the reel having a reel surface accessible through an opening in the tape cartridge, the reel surface defining a plurality of reel teeth concentric with the reel axis, the reel surface further defining a plurality of datum pads, each tape cartridge further having a tape opening for accessing the magnetic tape; and a tape unit receiving at least one of the plurality of tape cartridges, the tape unit comprising (a) at least one tape head for accessing information on the magnetic tape;

(b) a drive ring having a plurality of drive teeth located a fixed radial distance from a drive shaft, the drive teeth driving the tape reel by engaging the plurality of reel teeth;

(c) a datum ring defining an annular surface radially located about the drive shaft, the annular surface contacting the plurality of datum pads on the tape reel thereby axially positioning the tape reel relative to the drive shaft; and (d) a motor for spinning the drive ring, thereby driving the tape reel.

7. A system for accessing magnetic tape as in claim 6 wherein the plurality of datum pads is three datum pads, the three datum pads defining a tape reel axial location plane.

8. A system for accessing magnetic tape as in claim 6 further comprising a flexure assembly permitting the drive ring to float in the axial direction.

9. A system for accessing magnetic tape as in claim 6 further comprising a magnet for attracting a magnetically sensitive surface of the tape reel thereby engaging the plurality of drive teeth with mating teeth on the tape reel.

10. A method for rotating a magnetic tape reel about a drive axis comprising:

locating the tape reel relative to the drive axis by contacting an annular surface operative to rotate about the drive axis with a plurality of datum pads on a tape reel flange of the tape reel; and engaging drive teeth operative to rotate about the drive axis with mating reel teeth on the tape reel flange.

11. A method as in claim 10 wherein the number of datum pads is three, the datum pads axially locating the tape reel along the drive axis thereby positioning the tape reel in a plane defined by the annular surface.

12. A method as in claim 10 wherein engaging the drive teeth comprises magnetically attracting the drive teeth to the mating reel teeth.

* * * * *

UNITED STATES PATENT AND TRADEMARK OFFICE
CERTIFICATE OF CORRECTION

PATENT NO. : 6,279,845 B1
DATED : August 28, 2001
INVENTOR(S) : Wayne R. Hemzacek et al.

It is certified that error appears in the above-identified patent and that said Letters Patent is hereby corrected as shown below:

<u>Title page,</u>
Item [73], Assignee, after "Storage Technology Corporation, Louisville, CO (US)" add -- Imation Corporation, St. Paul, MN (US) --

Signed and Sealed this

Eleventh Day of March, 2003

JAMES E. ROGAN
*Director of the United States Patent and Trademark Office*